(12) United States Patent
Allgeyer et al.

(10) Patent No.: US 6,822,858 B2
(45) Date of Patent: Nov. 23, 2004

(54) DISK DRIVE MOUNTING SYSTEM FOR ABSORBING SHOCK AND VIBRATION IN A MACHINING ENVIRONMENT

(75) Inventors: Thomas L. Allgeyer, Cincinnati, OH (US); James J. Kemp, Pleasant Plain, OH (US); Clifford A. Leighty, West Chester, OH (US); Jeff J. Noe, Cincinnati, OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 217 days.

(21) Appl. No.: 10/180,757

(22) Filed: Jun. 26, 2002

(65) Prior Publication Data

US 2003/0206397 A1 Nov. 6, 2003

Related U.S. Application Data

(63) Continuation of application No. 09/442,684, filed on Nov. 18, 1999, now Pat. No. 6,477,042.

(51) Int. Cl.[7] .............................................. G11B 33/08
(52) U.S. Cl. ...................... 361/685; 361/683; 369/75.1; 369/247; 360/97.02
(58) Field of Search ................................. 361/683, 685, 361/687–688, 700–712, 717–719; 174/16.3, 115, 252, 52.1; 369/75.1, 247; 248/568; 340/407, 720, 815.14, 815.4; 267/136, 148, 149, 170, 174, 179, 179.1, 180; 29/505, 515, 516, 520; 360/97.1, 97.2

(56) References Cited

U.S. PATENT DOCUMENTS 5,400,196 A * 3/1995 Moser et al. ............ 360/97.02
6,487,039 B1 * 11/2002 Bernett .................... 360/97.02

FOREIGN PATENT DOCUMENTS

GB          2333638 A   *  7/1999  ........... G11B/19/20

* cited by examiner

*Primary Examiner*—Michael Datskovsky

(57) ABSTRACT

A disk drive mounting system for isolating a disk drive assembly from machine vibration and shock. In one embodiment, the system includes a suspension frame and a disk drive assembly mounted to the frame using biased vibration isolation members, such as springs, which are each substantially aligned through the center of mass of the disk drive assembly. Accordingly, vibrational forces can be transmitted through the center of mass of the disk drive assembly. Preferably, the disk drive assembly includes a mounting chassis which holds a hard disk drive and includes openings through which damping bumpers can extend. In this embodiment, the bumpers each have a base portion and an extension portion, the extension portion extending through the openings in the mounting chassis to limit the transfer of shock to the disk drive. The bumpers can be attached to the suspension frame and/or to a protective cover for the assembly. Preferably, a slide bracket is provided to allow the system to be easily mounted to a machine tool system surface.

2 Claims, 9 Drawing Sheets

(UPPER SPRING)

(LOWER SPRING)

DISK DRIVE MOUNTING SYSTEM FOR ABSORBING SHOCK AND VIBRATION IN A MACHINING ENVIRONMENT

RELATED APPLICATIONS

The present application is a continuation of U.S. application Ser. No. 09/442,684 filed Nov. 18, 1999, now U.S. Pat. No. 6,477,042.

TECHNICAL FIELD

The present invention relates generally to a disk drive mounting system for machine tools and other applications having vibrations in a particular range of frequencies. In particular, the invention relates to a hard drive mounting system having a suspension configuration in which the vibration isolation members are provided near the corners of a hard drive mounting chassis and substantially aligned through the center of gravity of the hard drive/mounting chassis structure. The present invention also relates to a hard drive transportation system which includes damping members which protrude through holes in the hard drive mounting chassis.

BACKGROUND OF THE INVENTION

The use of disk drives in machining applications has become commonplace. In such uses, the disk drive stores data and instructions for controlling the operation of a machine tool. Such machines are typically driven by one or more electric motors which rotate either the tool or the part to be machined during the machining process. The impact of the cutter tooth on the work surface often causes vibration throughout the various machine components, and the amplitude and frequency of the vibration can vary based upon many factors. For example, a tool with few cutting teeth will typically cause more violent shaking of the machine than a tool with many cutting teeth.

In addition to vibration, such machines can also be subjected to shock forces during operation, as well as at other times. For example, during operation, if components collide at a substantial speed, a forceful jolt to the machine will occur which is transmitted through the machine. Similarly, during shipment of the machine, if it is dropped or otherwise mishandled, a shock force can be transmitted to one or more of the machine components.

As can be understood, significant vibrations and shocks which can arise in machine tool systems can interfere with the operation of machine components. Disk drives in particular are susceptible to malfunctions due to vibration and shock, because of the tight spacing between the drive head and the memory medium and because of the precise placement of the information throughout the medium. Accordingly, violent vibrations and shock can cause the drive head to contact the memory medium, thereby damaging the medium and/or the head. Also, such vibrations and shock, if occurring during the drive operation, can cause data corruption and data loss.

While various damping and isolation systems have been proposed for protecting disk drives in machining environments, the problems of data loss and disk drive damage during operation still have not been completely solved. Some mounting systems can actually amplify a transmitted vibration, causing damage to the components which were to be isolated. Generally, damage results when the isolated component undergoes a deflection that exceeds the allowable sway space, causing the component to contact a hard surface.

Moreover, while various wedges, clamps, solenoids, and other lock-down devices have been utilized for protecting drives during shipment, such devices are not without disadvantages. For example, the lock-down device can inadvertently become unlocked or be inadequate for the shock that is experienced. Moreover, if one forgets to lock the device before shipment or to unlock the device after shipment, data loss and drive damage can occur. Foam and rubber pads have been utilized to protect a disk drive from shock and vibration. However, such pads typically only limit movement in a single linear direction.

Accordingly, there remains a need for a disk drive mounting system which more effectively isolates shock and vibrational forces. In particular, there remains a need for a disk drive mounting system which can withstand shock and/or vibration created by a variety of machine tools. In addition, there remains a need for a disk drive mounting system which can effectively dampen shipping forces and which does not need to be locked prior to shipping and unlocked subsequent to shipping.

SUMMARY OF THE INVENTION

One object of the present invention is to obviate the above-described problems.

It is another object of the present invention to provide a disk drive mounting system which effectively isolates shocks and vibrations;

Another object of the present invention is to provide a disk drive mounting system which effectively isolates vibrations encountered in a machining environment.

Yet another object of the present invention is to provide a disk drive mounting system which can isolate shock during shipment without requiring locking and unlocking of a device.

It is a further object of the present invention to provide a disk drive mounting system suitable for a machine tool environment which protects against disk drive damage, data loss, and/or data corruption.

A further object of the invention is to provide a disk drive mounting system which can be pre-assembled with a disk drive to create an assembly which is relatively simple to install at the site of use.

It is yet another object of the present invention to provide a disk drive mounting system which is cost effective and minimizes the number of parts needed.

To achieve the foregoing and other objects, a disk drive mounting system is provided which comprises a suspension frame and a disk drive assembly having a center of mass. The system also includes a vibration isolation member attached between the suspension frame and the disk drive assembly. The vibration isolation member defines a central axis which is substantially aligned with the center of mass of the disk drive assembly.

A disk drive mounting system is also provided which includes a disk drive assembly, a mounting chassis connected to the disk drive assembly, and a housing member. The mounting chassis includes an opening, and a damping member is connected to the housing member and extends through the opening of the mounting chassis.

In addition, a disk drive mounting system is provided which comprises a suspension frame, a disk drive assembly, and a mounting chassis connected to the disk drive assembly. The mounting chassis includes an opening, and a damping member is connected to the suspension frame and extends through the opening of the mounting chassis. A vibration isolation member is also provided which extends between the suspension frame and the mounting chassis.

Still other objects of the present invention will become apparent to those skilled in this art from the following description wherein there is shown and described preferred embodiments of this invention, including a best mode currently contemplated for carrying out the invention, simply for the purposes of illustration. As will be realized, the invention is capable of other different aspects and embodiments without departing from the scope of the invention. Accordingly, the objects, drawings, and descriptions are illustrative in nature and not restrictive in nature.

BRIEF DESCRIPTION OF THE DRAWINGS

While the specification concludes with claims particularly pointing out and distinctly claiming the invention, it is believed that the same will be better understood from the following description taken in conjunction with the accompanying drawings in which:

DETAILED DESCRIPTION OF PREFERRED EMBODIMENTS

Figure 1:
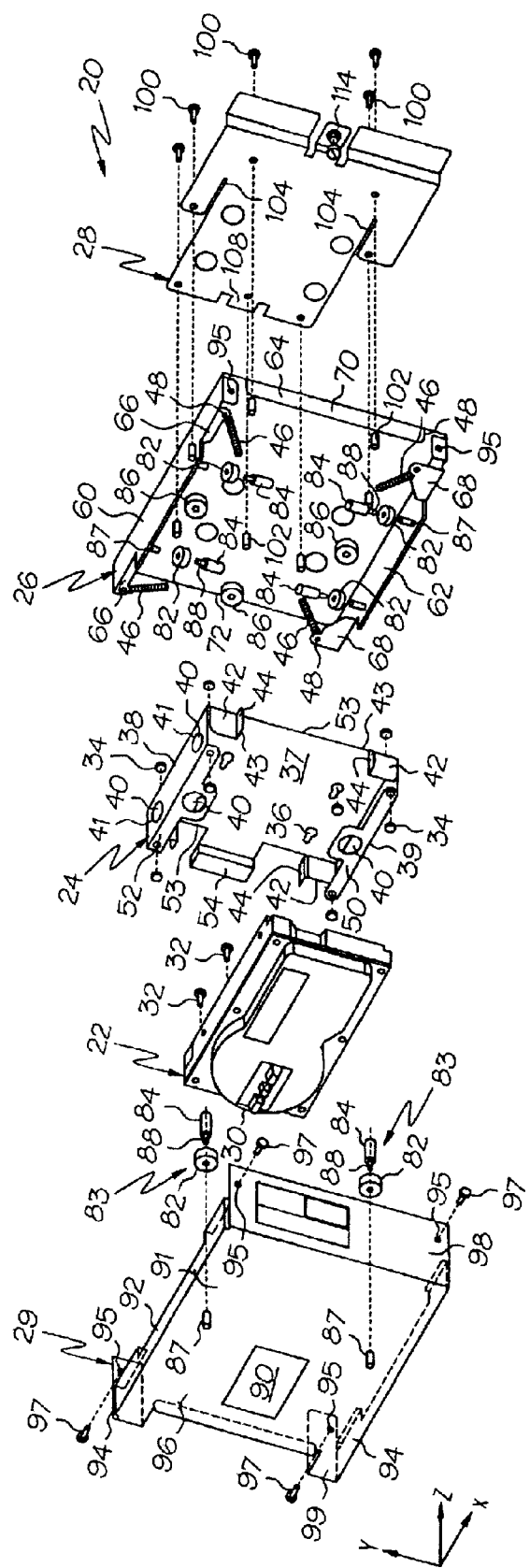
FIG. 1 is an exploded perspective view of one embodiment of a disk drive mounting system made in accordance with principles of the present invention.

Turning now to the drawings in detail, wherein like numbers illustrate corresponding structure, FIG. 1 is an exploded perspective view of one embodiment of a disk drive mounting system 20, made in accordance with principles of the present invention. In this embodiment, the assembly 20 comprises a disk drive assembly 22, a disk drive mounting chassis 24, a suspension frame 26, a bracket 28, and a cover 29.

The disk drive assembly 22 preferably comprises a read/write head, a housing, and a memory disk having data for use in operating a machine tool system. For example, the disk drive 22 could comprise a Model QM31620ST-A hard disk drive made by Quantum Corp. In addition to hard disk drives, the disk drive 22 could comprise any of a variety of drives used to store data, such as CD ROM drives, floppy disk drives, and ZIP drives for example. The disk drive 22 can include indicators 30, such as to display the operation mode of the drive, and/or to indicate that a shock has been experienced by the drive, for example.

The mounting chassis 24 partially encloses the disk drive 22 to provide support and protection for the drive, and to connect to vibration isolation and damping devices. In the embodiment of FIG. 1, the mounting chassis 24 includes a base 37 to which the disk drive 22 is secured. Preferably, the drive 22 is secured to the mounting chassis 24 in a stable manner, to limit the movement of the drive within the chassis. Any of a variety of fasteners, connectors, clamps, or other hard-mounting mechanisms, for example, could be utilized for this purpose. For instance, screws 32 and washers 34 could engage apertures 36.

The mounting chassis 24 of FIG. 1 also preferably includes a top side 38 which extends outwardly from the base 37 near its top, and a bottom side 39 which extends outwardly from the base 37 near its bottom. The top side 38 and bottom side 39 each preferably include a pair of openings 40. As will be described below, each of these openings 40 is sized to receive a damping member having a diameter which is smaller than the respective opening. The openings 40 could alternatively comprise holes, cutouts, recesses, etc.

A bottom extension 50 extends upwardly from the bottom side 39 and a top extension 52 extends downwardly from the top side 38. The extensions 50 and 52 also each include an opening 40. However, as will be understood, the placement and number of openings in the chassis 24, as well as the configuration of the chassis itself, can vary and good results still achieved.

The exemplary mounting chassis 24 also includes four L-shaped connecter brackets 42, each of which extends outwardly from sides 53 of the base 37 near its four corners. Each bracket 42 includes a connector tab 43 having a receptor hole 44 for receiving one end of a vibration isolation device, as described below. However, other appropriate structural arrangements for connecting the vibration isolation device could be utilized.

Figure 5:
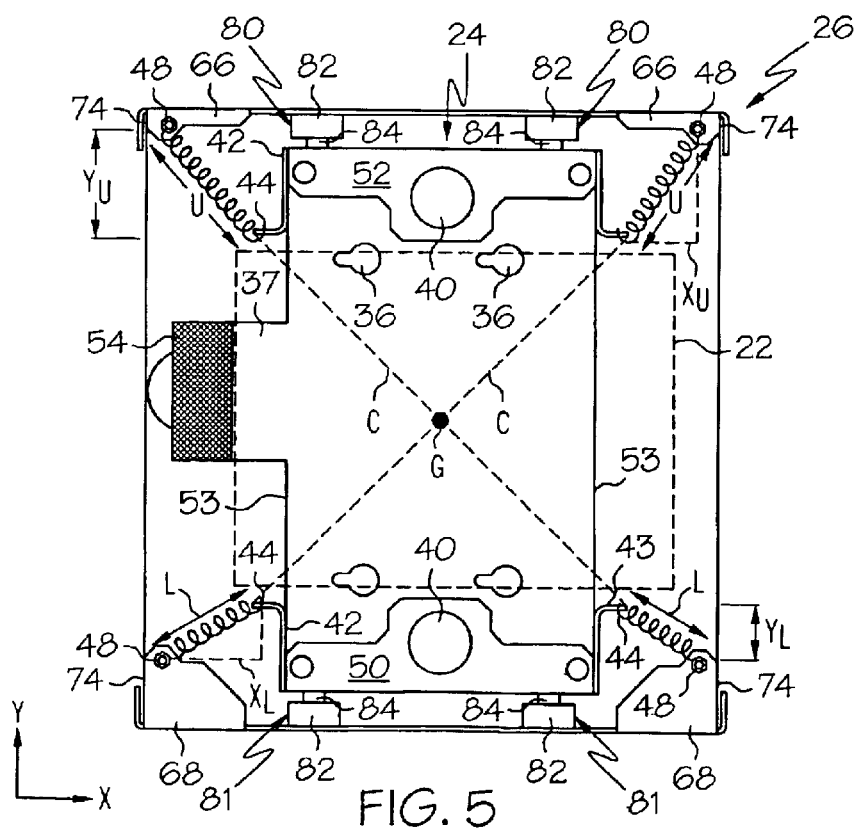
FIG. 5 is a side view of the suspension frame, as well as the corresponding suspended mounting chassis, of the disk drive mounting assembly of FIG. 3.

Near one side 53 of the base 37 is a foam or rubber pad 54. As best shown in FIG. 5, the disk drive 22 is located adjacent to the pad 54 once it is secured to the base 37. The primary purpose of the pad 54 is to retain a computer data connector and cable to the drive 22, and the pad preferably is made from an effective shock absorbing material, such as foam, polyurethane, rubber, or elastomer, for instance. In addition, the pad 54 can be adhered or otherwise attached to the chassis 24.

Returning again to FIG. 1, the mounting chassis 24, with disk drive 22 secured thereto, is suspended from the suspension frame 26, which includes a top 60 and bottom 62 which extend outwardly from a base 64. Supporting or housing the mounting chassis 24 and connected disk drive 22, the suspension frame 26 isolates shock and vibration and limits the transmission of shock and vibration to the mounting chassis/hard drive (22/24) combination.

In particular, as shown in FIGS. 1 and 5, springs 46 connect between the suspension frame 26 and the mounting chassis 24. More specifically, two upper connector tabs 66 extend downwardly from the top 60, and two lower connector tabs 68 extend upwardly from the bottom 62 of the suspension frame 60. Each connector tab 66 and 68 includes a spring receptor hole 44. Each of the four springs 46 is arranged between the receptor hole 44 on the mounting chassis 24 and a receptor hole 48 on the suspension frame 26. Accordingly, the combination of the mounting chassis 24 and the disk drive 22 which is rigidly attached thereto, is suspended between the top 60 and bottom 62 by the springs 46 which extend outwardly near the corners of the chassis.

This suspension configuration is shown in FIG. 5. Each spring 46 extends generally diagonally from a receptor hole 48 near a corner of the suspension frame 26 to a receptor hole 44 of the mounting chassis 24. Accordingly, the central axis C of each spring 46 is substantially aligned with the center of mass G of the combination of the mounting chassis 24 and the disk drive 22. One way to provide such a configuration is to place each hole 48 on the suspension frame 26 and each hole 44 on the mounting chassis 24 such that each pair of corresponding holes is aligned through the center of mass G. A substantially linear-shaped spring 46 can then be stretched across the space between corresponding holes 48 and 44. In this configuration, the central axis C of the spring 46 forms an approximately forty-five degree angle with the outer edge 74 of the corresponding connector tab (66 or 68). After placement of the mounting chassis 24 and connected disk drive 22 in the suspension frame 26 using the springs 46, the springs will shift somewhat from the original alignment, due to the weight of the chassis/disk drive combination. The actual deflection due to the weight can be calculated, as described below. Due to the differing angles of the upper and lower springs caused by the weight, vibrations in the x-axis can induce undesirable rotary motion.

Accordingly, as an alternative, it is preferred that the holes 44 and 48 are placed such that the springs 46 are aligned somewhat off from the center of mass G prior to connecting the mounting chassis 24 with attached disk drive 22, but then are substantially aligned with the center of mass G after connection of the mounting chassis with attached disk drive. The approximate coordinates of the center of mass G can be located in any number of appropriate ways, such as by balancing the disk drive 22 and mounting chassis 24 assembly about various axes, for example.

Such a configuration of aligning the springs 46 (or other appropriate isolation structure) approximately through the center of mass G has been found to provide good isolation of shocks and vibrations which occur in a machine tool environment, as it has been found that vibrations can be well-controlled when transmitted through or near the center of mass G. Vibrations of interest in such environments are typically in the range of about 20 Hz to about 1000 Hz.

Also, the placement of the four springs 46 in an angled fashion between the approximate corners of the suspension frame 26 and the approximate corners of the mounting chassis 24 has been found to effectively isolate the freedom of movement of the mounting chassis 24/disk drive 22 in all three translational orthogonal axes and all three rotational orthogonal axes.

Figure 8:
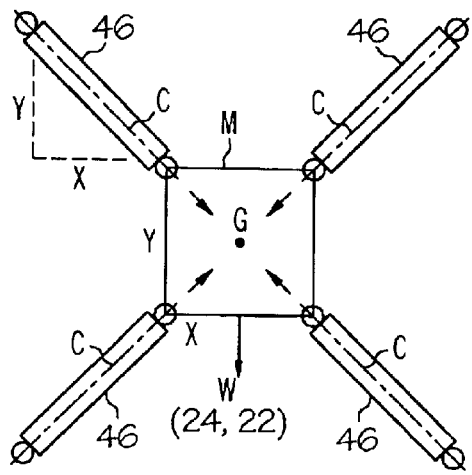
FIGS. 8 and 9 are side views of vibration isolation member configurations, such as could be utilized with a disk drive mounting system made according to the present invention.

FIG. 8 illustrates the situation where the springs 46 are slightly misaligned from the center of gravity G after being connected to the load W of the disk drive 22 and mounting chassis 24. As seen in this figure, each spring 46 has a central axis C which is nearly aligned with the center of gravity G. In this example, all of the springs 46 have approximately the same spring constant, tension, and initial length, and each spring meets the x and y axes of the mass M (e.g., combination of disk drive 22 and mounting chassis 24) at approximately a 45 degree angle prior to application of the load W.

Figure 10:
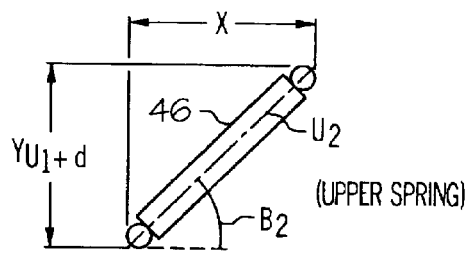
FIG. 10 shows geometric relationships of the systems of FIGS. 8 and 9, which can be used to derive equations for finding the natural frequency and final positions of the system.
Figure 10:
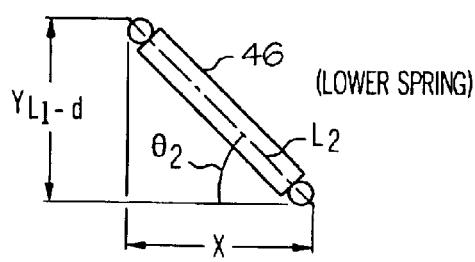

Spring mounting points for the systems of FIG. 8, and as well as the resonant frequency for the systems, can be calculated using the following equations as described with respect to the geometry illustrated in FIG. 10:

The sum of the forces acting in the system will equal zero. Accordingly, the following equation applies:

$$TU2(\sin(\beta2)) - TL2(\sin(\Theta2)) - W = 0$$

where: W is the weight of the load to be isolated, divided by 2;
TU2 is the tension in the upper spring, after stretching by the load;
TL2 is the tension in the lower spring, after stretching by the load;
$\beta2$ is the angle of the upper spring, from the horizontal, after stretching; and
$\Theta2$ is the angle of the lower spring, from the horizontal, after stretching.

It is known that the tension in the upper spring, after deflection is:

$$TU2 = K(U2 - U1)$$

where: K is the spring constant for all four springs;
U2 is the upper spring length, after stretching by the load; and
U1 is the upper spring length, before stretching by the load.

Similarly, the tension in the lower spring after deflection is known to be:

$$TL2 = K(L2 - L1)$$

where: L2 is the lower spring length, after stretching by the load; and
L1 is the lower spring length, before stretching by the load.

Accordingly, the sum of the forces equation becomes:

$$(U2 - U1)(\sin(\beta2)) - (L2 - L1)(\sin(\Theta2)) - W/K = 0$$

From FIG. 10 and rules of geometry, the quantities $\sin(\beta2)$ and $\sin(\Theta2)$ can be represented by the following equations:

$$\sin(\beta2) = \frac{(TU1 + d)}{\sqrt{(YU1 + d)^2 + (X)^2}}$$

$$\sin(\Theta2) = \frac{(YL1 - d)}{\sqrt{(YL1 - d)^2 + (X)^2}}$$

where: YU1 is the initial y dimension of the upper spring mounts;
YL1 is the initial y dimension of the lower spring mounts; and
X is the X dimension of the spring mounts (same for upper and lower).

Also, the geometry of FIG. 10 shows that:

$$U2 = \sqrt{(YU1 + d)^2 + (X)^2}$$

$$L2 = \sqrt{(YL1 - d)^2 + (X)^2}$$

Thus, the sum of the forces equation becomes:

$$\frac{\left(\left(\sqrt{(YU1+d)^2+(X)^2}\right)-U1\right)(YU1+d)}{\sqrt{(YU1+d)^2+(X)^2}} -$$

$$\frac{\left(\left(\sqrt{(YL1-d)^2+(X)^2}\right)-L1\right)(YL1)-d}{\sqrt{(YL1-d)^2+(X)^2}} - \frac{W}{K} = 0$$

All of the values in this equation are known for the initial pre-load design, except for K (which can be selected) and except for d. Accordingly, this equation is then solved for d, where the function equals 0.

The natural frequency can then be calculated using the following equation:

$$f_{natural}=3.13(1/d)^{0.5}$$

It is preferred that the system is designed such that this natural frequency is much lower than the vibration frequencies which are to be dampened. For example, in a machine tool environment, significant vibration frequencies of from about 20 Hz to about 1000 Hz are common. Because the suspension system described provides vibration improvement starting around 1.4 times the resonant frequency, it is therefore preferred that the natural frequency be below around 14 Hz (20 divided by 1.4), and most preferably between about 5 Hz and about 10 Hz. Thus, the above equations can be utilized to select a spring constant K, obtain the value of d based upon that spring constant K, and the final resting positions U2 and L2 can then be calculated. Typically, softer springs with lower K values will provide lower natural frequencies, assuming the other parameters are the same.

Figure 9:
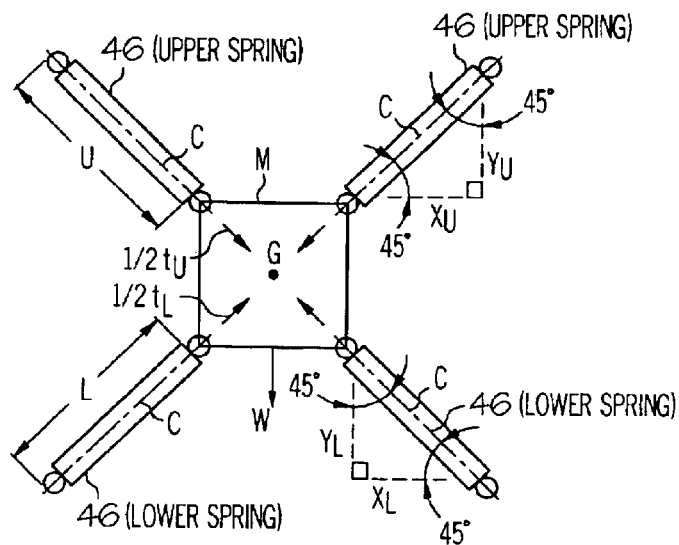

Preferably, and as shown in FIG. 9, the system can be designed such that the angle of the springs 46 under load is forty-five degrees, thereby allowing the central axis C of each spring 46 to be aligned with the center of gravity G of the mass M (e.g., combination of disk drive and mounting chassis). This configuration allows vibrational forces in the upper and lower springs 46 to be directed through or near the center of mass G. In this case, the springs 46 apply their force through the center of mass and all spring angles are equal (i.e., 45 degrees). As noted earlier, such a configuration of equal spring angles is preferred because it forces the x-axis spring rate vector component for the top springs to be the same as the lower springs. If these components are not equal, x-axis vibration could convert to undesirable rotary motion of the isolation system.

This alternative is shown in the example of FIG. 9. To design such a system (shown here for a smaller drive), the known parameters can be the spring constants K for the springs 46, the distance in the x axis of the lower spring mount (shown as $X_{lower}$ in FIG. 9), and the desired upper and lower forty-five degree angles. Using an equation relating the sum of the forces in the system, it is known that the weight W is equal to the y vector of the tension in the upper springs ($t_u$) minus the y vector of the tension in the lower springs ($t_l$). Because the angle is forty-five degrees, each y vector of tension is $\sin(\pi/4)$ of the respective upper or lower tension. Accordingly, the system is represented by the following equation:

$$W=\sin(\pi/4)t_u-\sin(\pi/4)t_l \qquad (1)$$

The tension $t_u$ is known to be related to the spring constant K, the stretched length U of the upper springs, and the initial unstretched length $U_i$ of the upper springs, as follows:

$$t_u=K(U-U_i)+b \qquad (2)$$

(where b is the mathematical bias tension required in the spring equation t=kx+b, to compensate for the non-linear initial deflection. The spring is non-linear until all coils are extended enough that they do not touch.)

Similarly, the tension in the lower springs is related to the spring constant K, the stretched length L of the lower springs, and the initial unstretched length $L_i$ of the lower springs:

$$t_l=K(L-L_i)+b \qquad (3)$$

Plugging the equations (2) and (3) into equation (1), yields the following equation:

$$W=(0.707)(K(U-U_i)+b)-(0.707)(K(L-L_i)+b) \qquad (4)$$

As can be understood, the b terms in equation (4) will cancel. Also, the $U_i$ and $L_i$ terms will cancel, if the springs are selected to be of the same initial length. Accordingly, the stretched length U of the upper springs will be related to the stretched length L of the lower springs, by the following equation:

$$U=(W/2*0.707*K)+L \qquad (5)$$

Thus, a desired length L can be selected for the stretched length of the lower springs, and the resulting length U can be solved to determine the resulting length of the upper springs. For example, assuming a weight W of 0.24 pounds, a spring constant K of 0.4, and a stretched length L of 1.25 inches for each lower spring, the resulting upper spring length U is 1.674 inches.

Returning again to FIG. 5, the placement of the holes 48 on the frame 26, as well as the placement of the holes 44 on the mounting chassis 24 can be selected based upon the L values and U values which are determined, such as by using equation (5) above. In particular, the mounting points $X_U$, $X_L$, $Y_U$, and $Y_L$ can be found using the following trigonometric relationships:

$$X_U=U*\cos(\pi/4)$$

$$X_L=L*\cos(\pi/4)$$

$$Y_U=U*\sin(\pi/4)$$

$$Y_L=L*\sin(\pi/4)$$

As noted, the resulting forty-five degree angles using this configuration and spring design allows the central axes of the springs 46 to be aligned with the center of mass G, thereby providing excellent vibration isolation in the X and Y axes. The natural frequency can be calculated using the solution for d and $f_{natural}$ described above. Again, the natural frequency of the system should be significantly lower than the frequencies of interest. The spring constant can be selected from spring tables to achieve an acceptable natural frequency.

Preferably, the springs 46 are coiled extension springs having hooks or eyelets on each end. As an example, cylindrical wire extension springs could be utilized, each having a natural frequency of around 135 Hz, a spring index of around 8.62, and a rate of around 2.1 pounds per inch. The springs 46 are preferably made of a stainless steel material, or other non-corrosive material.

While springs are the preferred vibration isolation member to be used with this invention, it is contemplated that other mechanisms might work as well, such as vibration or shock absorber devices, isolation mechanisms, elastic and resilient members or materials, etc. Also, it is preferred that all four springs 46 of this embodiment are in tension after the system 20 has been assembled.

Figure 3:
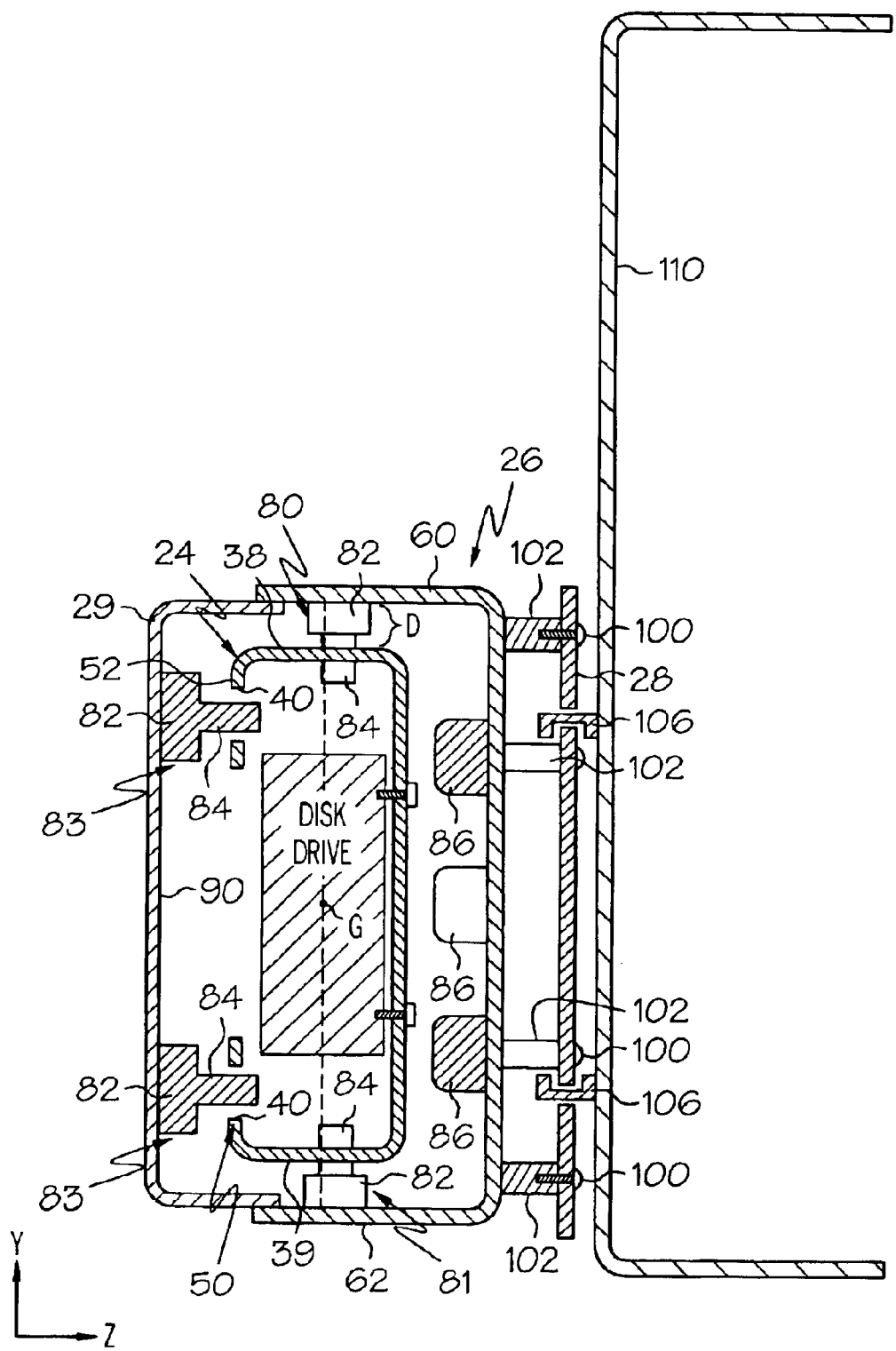
FIG. 3 is a cross-sectional view of the disk drive mounting system of FIG. 2, taken along line 3—3 of FIG. 2.

Turning now to the views of FIGS. 1, 3, 4, and 5, the suspension frame 26 also preferably includes upper bumpers 80 and lower bumpers 81 for providing shock protection, particularly during transportation of the assembly 20. The two upper bumpers 80 are attached to the top 60 of the frame 26, and the two lower bumpers 81 are attached to the bottom 62 of the frame. Preferably, the bumpers 80 and 81 are provided with a base section 82 and an extension section 84. After assembly of the system 20, the base sections 82 for the lower bumpers 81 are located between the bottom side 39 of the mounting chassis 24 and the bottom 62 of the frame 26. Similarly, the base sections 82 for the upper bumpers 80 are located between the top side 38 of the mounting chassis 24 and the top 60 of the suspension frame 26. As shown in FIG. 3, preferably, the height of each base section 82 is less than the distance D between the mounting chassis 24 and the suspension frame 26. Enough sway space should be provided between the base section 82 and the mounting chassis 24 to prevent the bumpers from contacting the chassis during normal operating vibration. Testing can be conducted to determine adequate sway space and adequate bumper type for shock forces that may be encountered.

Each extension section 84 of the bumpers 80 and 81 extends through one of the openings 40 provided on the top 38 or bottom 39 of the mounting chassis 24. Also, each extension section 84 has dimensions which are smaller than the corresponding dimensions of the corresponding opening 40, such that the extension section can fit through the opening. Preferably, the extension sections 84 are round in shape, as are the holes 40, and the diameter of the extension sections 84 is less than the diameter of the holes 40. (For example, each extension section 84 could have diameter of around 0.4 inches, and each hole 41 could have a diameter of around 0.75 inches.) This allows for the mounting chassis 24 to move somewhat during operation and/or transportation. However, a large movement in either the X direction or Z directions of FIG. 1 will cause at least one edge 41 of the mounting chassis 24 which defines an opening 40 to contact the extension section 84 of a bumper 80 or 81.

The extension section 84, as well as the base section 82 of the bumpers 80 are preferably made of a flexible and resilient material, such as a rubber-like material, or a urethane foam material, for example. For instance, the bumpers 80 and 81 could be made from ISOLOSS HD urethane, manufactured by E-A-R Specialty Composites of Indianapolis, Ind. In one embodiment, the extension section 84 is a male-blank sandwich mount ISOLOSS elastomer having a compression maximum of around 8 pounds, and the base section 82 is a larger diameter female-blank mount ISOLOSS elastomer having a compression maximum of around 45 pounds. This exemplary material has a typical durometer hardness of about 56. However, it should be understood that other types damping members can be used as alternatives to the bumpers 80 and 81, such as rubber or foam stops or cylinders.

Accordingly, excessive movement causes contact between the extension section 84 and the edge 41 of the mounting chassis 24 which defines the opening 40 which thereby causes the extension section 84 to flex, or deflect, to thereby absorb and store the shock and dissipate it as heat. This shock absorption allows less energy to be transmitted back to the drive 22 and chassis 24, and prevents these components from contacting a rigid surface, or other less forgiving surface.

On the other hand, excessive movement of the mounting chassis 24 relative to the suspension frame 26 in the Y direction of FIG. 1 causes the top side 38 of the chassis to contact the base sections 82 of the upper bumpers 80, or the bottom side 39 of the chassis to contact the base sections 82 of the lower bumpers 81. This is because the base sections 82 each have at least one dimension which is larger than the corresponding dimension of the corresponding opening 40 in the chassis 24. Preferably, each base section 82 and each opening 40 are circular in shape, the base section 82 having a diameter larger than that of the opening 40 (e.g., the base section could have a 1.00 inch diameter and the opening could have a 0.75 inch diameter). As an alternative, the base section 82 could be positioned off from the center of the opening 40, such that it will not pass through the opening. As another alternative, rather than providing two separate sections 82 and 84, the bumpers 80 and 81 could comprise an integral member with varying dimension, the distal section of the bumper having a dimension allowing it to pass through the opening 40, and the proximal section of the bumper having a dimension which prevents it from passing through the opening 40.

The base sections 82 will flex or give somewhat upon contact, thereby absorbing the Y-direction shock and preventing the undesirable situation of a rigid material contacting a rigid material. This configuration of the bumpers 81 and 80 allows for some freedom of movement in the X, Y, and Z axes, but dampens excessive movement in these axes, such as due to shock. The extensions 84 and holes 40 dampen excessive motion in both directions of the X and Z axes, while the base 82 dampens excessive motion in one direction of the Y axis.

Similarly, flexible and resilient crash bumpers 86 are also preferably attached to the base 64 of the suspension frame 26, such that they rest between the base 64 and the base 37 of the mounting chassis 24. These bumpers 86 provide additional shock absorption for movement of the chassis 24 relative to the frame 26 in the Z direction. Preferably, the bumpers 86 are also a urethane foam material, although other shock absorbing material could be utilized.

The bumpers 80 and 81 can be secured to the frame 26 in any suitable manner. In the embodiment of FIG. 1, a receptor post 87 runs through the middle of the base sections 82 and is secured to a screw 88 attached to the extension section 84. The bumpers 86 of this embodiment are secured using adhesive.

As best shown in FIGS. 1 and 3, side bumpers 83 are attached to the inner side 91 of the cover 29. Like the bumpers 81 and 80, the bumpers 83 also preferably include a base section 82 and an extension section 84, which are made of a soft, flexible, and resilient material, such as urethane foam for example. The extension sections 84 enter through openings 40 on the top and bottom extensions 50 and 52 of the mounting chassis 24, and have a diameter less than that of the openings 40, such as described above with respect to bumpers 80 and 81. This configuration of the side bumpers 83 relative to the mounting chassis 24 provides some freedom of movement of the mounting chassis 24 relative to the cover 29 in the X and Y directions, but also allows the extension sections 84 to the large movements in these axes (in either direction) which can be associated with shocks, such as can occur during operation and transportation for example. Because the base sections 82 of the side bumpers 83 have at least one dimension which is larger than the corresponding dimension of the corresponding hole 40, the base sections 82 cannot fit through the holes 40. Preferably, the base sections 82 and holes 40 are round in shape, the base section having a diameter which is larger than that of the hole. Accordingly, shocks and vibration which cause movement in the negative Z direction cause the top and/or bottom extensions 52 and 50 of the chassis 24 to contact the base sections 82 of the side bumpers 83, and the base sections absorb the movement thereby preventing the rigid material of the mounting chassis 24 from contacting the rigid material of the cover 29. To secure the side bumpers 83 to the cover 29, posts 87 which extend through the center of the base sections 82 can connect to screws 88 which are secured to the extension sections 84. Other appropriate connectors, adhesives, or the like could be utilized as well.

Accordingly, the bumpers 80, 81, 83, and 86 effectively dampen shock forces in the X, Y, and Z axes, and reduce the risk that rigid materials will come into contact.

Figure 4:
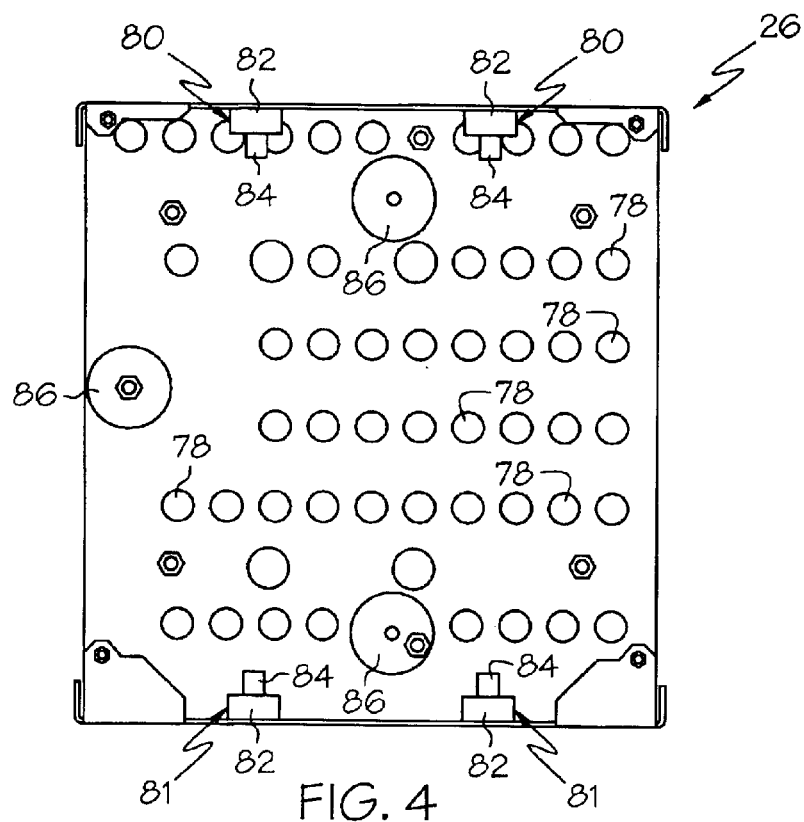
FIG. 4 is a side view of the suspension frame of the disk drive mounting system of FIG. 3.

As shown in FIG. 4, the suspension frame 26 preferably includes a number of apertures 78 which are formed in the base 64 of the frame. These apertures 78 reduce the weight and amount of material required for the frame 26, and also can provide some ventilation for the disk drive 22. Similar apertures can also be provided in the mounting chassis 24 and/or the cover 29.

Figure 2:
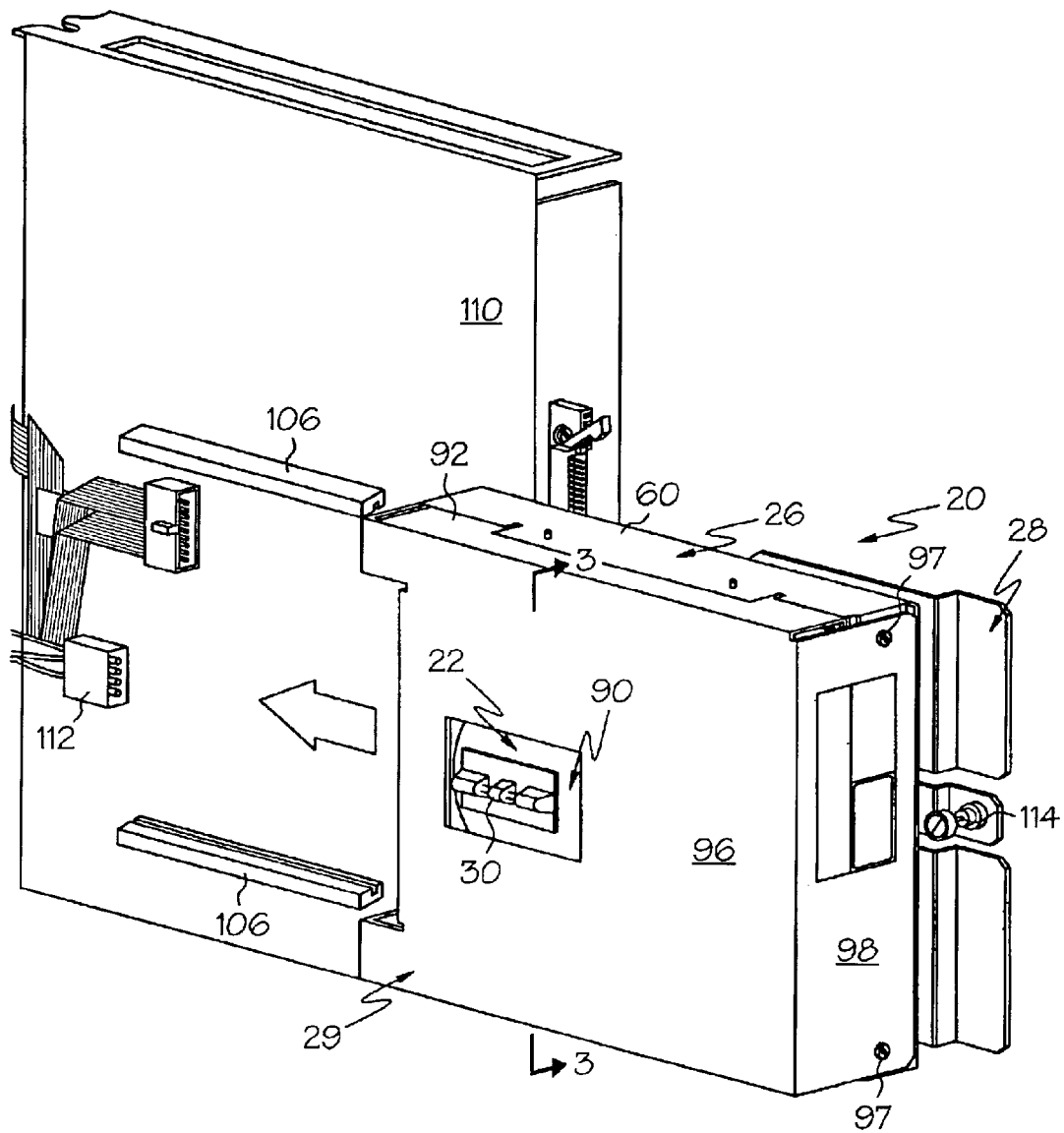
FIG. 2 is an assembled perspective view of the disk drive mounting system of FIG. 1, showing an exemplary engagement with a computer controller for a machine tool system.

Turning now to the cover 29, shown best in FIGS. 1 and 2, preferably the cover includes a top panel 92, a bottom panel 94, and a side panel 98, which connect to the corresponding sides of a front panel 96. A pair of attachment tabs 99 can be provided on one side of the front panel 96. Preferably, the cover 29 is secured to the suspension frame 26 using suitable connectors or adhesives. For example, screws 97 can engage holes 95 in the cover 29 and frame 26. The cover 29 can also include a window 90 in its front panel 96 to allow indicators 30 on the disk drive 22 to be seen.

Turning now to FIGS. 1, 2, and 3, a slide bracket 28 is preferably attached to the suspension frame 26, such as by using screws 100 and spacers 102, or other suitable connectors. The slide bracket 28 also can include a pair of grooves 104, as shown in FIG. 1. The grooves 104 are sized and configured to engage rails 106, shown in FIGS. 2 and 3, which are mounted to a machine control housing 110, or other desired assembly. A tongue 108 can also be provided on the slide bracket 28 to engage the housing 110. As shown in FIG. 2, a connector 112 is provided to electrically connect the disk drive 22 to a computer or machine control which will control the disk drive. Preferably, the connector 112 is made of a flexible material, like a flexible plastic or rubber, so as to absorb shock during operation of the machine. A fastener 114, such as a thumb screw, can also be provided to secure the slide bracket 28 to the housing 110.

Because the slide bracket 28 slidingly engages the rails 106 in this embodiment, the assembly 20 can be easily removed, serviced, and replaced. Thus, when software changes or updates need to be made in the disk drive 22, such changes can be made and the system 20 assembled at a service center prior to visiting the location of the machine tool system 120. At the machine tool location, the assembly 20 can then be quickly and easily installed by sliding the bracket 28 along the rails 106.

Preferably, the cover 29, mounting chassis 24, suspension frame 26, and slide bracket 28 are made of a rigid material. For example, metallic materials or plastic materials could be utilized. In one exemplary embodiment, a 0.064 inch thick aluminum is utilized to help minimize the mass. It is also preferred that the tabs 66 and 68 of the suspension frame 26 are made of a wear-resistant material, such as stainless steel for example, to prevent the springs 46 from easily wearing through the frame during use. Likewise, it is preferred that the tabs 43 of the mounting chassis 24 are made from a wear-resistant material, to prevent the springs 43 from wearing through.

Figure 6:
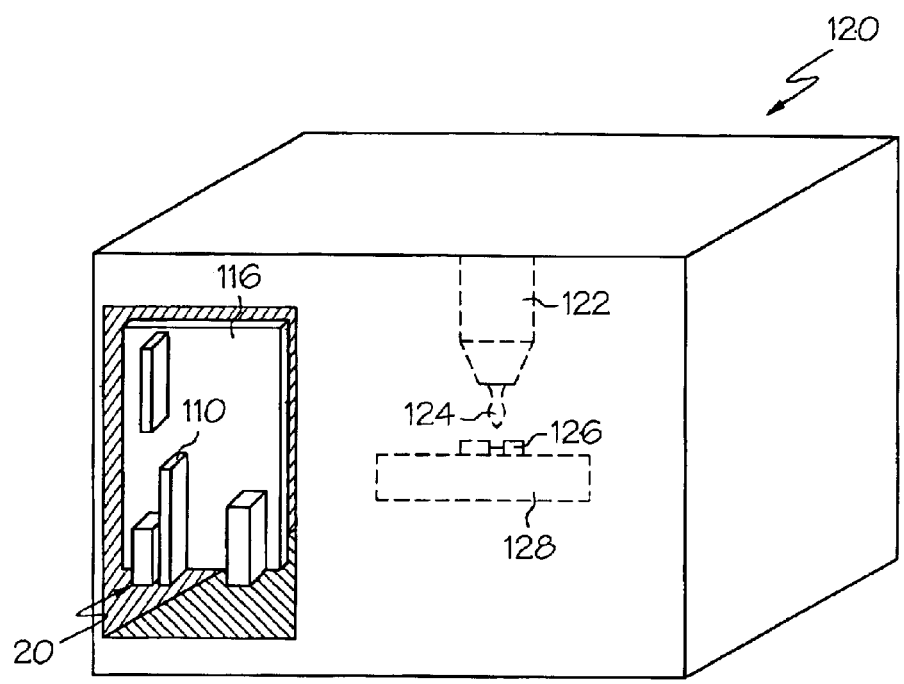
FIG. 6 is a back perspective view of a machining center, showing a disk drive mounting system such as illustrated in FIG. 3 connected to the machining center.

As best shown in FIG. 6, the disk drive mounting assembly 20 is preferably attached to the housing 110, which, in turn, is mounted to an electrical panel 116 within a machine tool system 120. Other mounting configurations could be utilized as alternatives to that shown, such as mounting the assembly 20 to a panel or rack in the machine tool system 120. The machine tool system 120 includes a spindle 122 which holds a tool 124 for operating on a workpiece 126 which rests on a table 128. The tool 124 moves relative to the workpiece 126 for performing the desired shaping of the workpiece. The machine tool system 120 could comprise a vertical machining center, or a horizontal machining center, for instance.

Figure 11A:
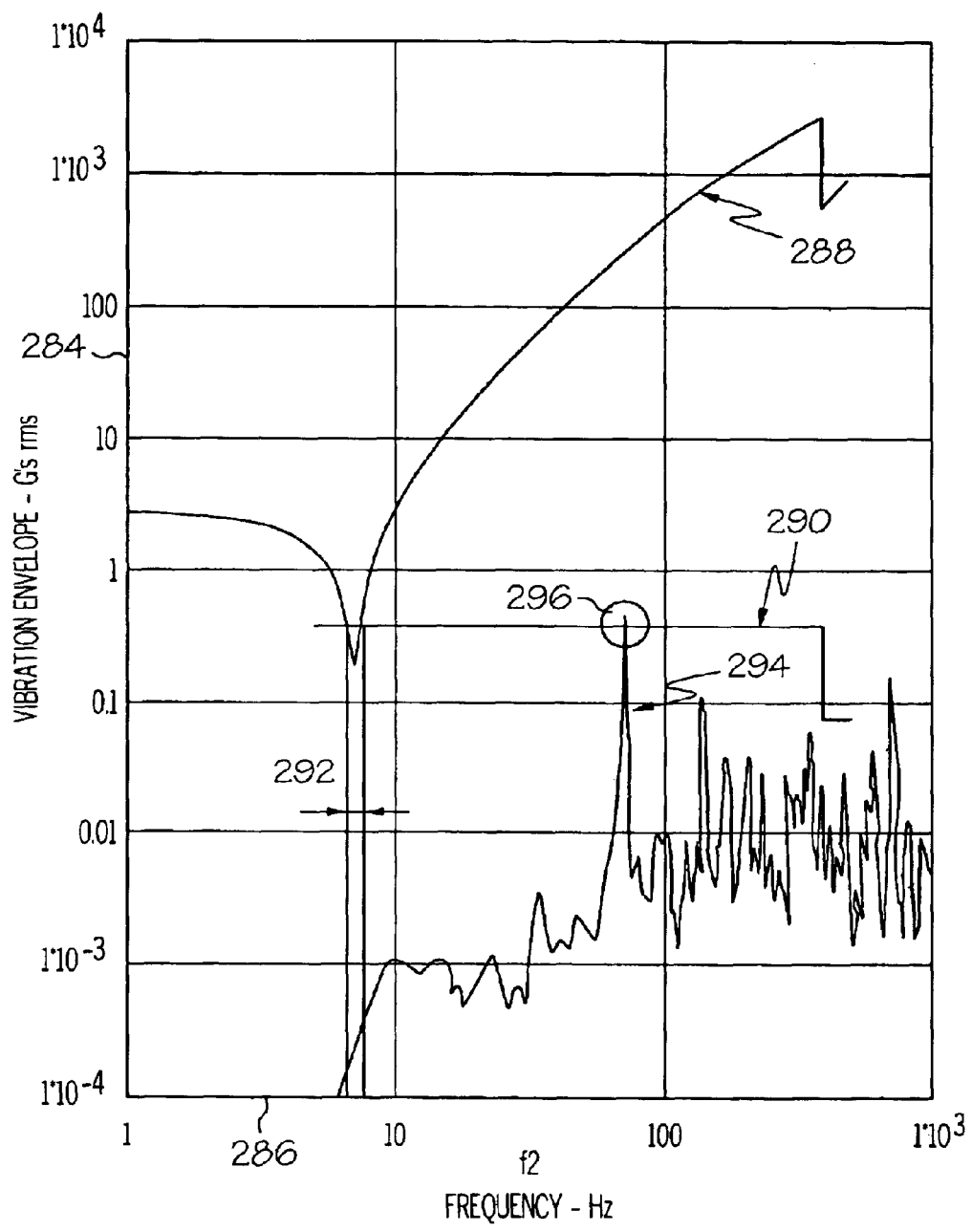
FIGS. 11a, 11b, and 11c are graphs showing the vibrational protection which can be achieved by a disk drive mounting system made in accordance with principles of the present invention, as well as the comparative vibrations which can be created by exemplary machine tools.
Figure 11B:
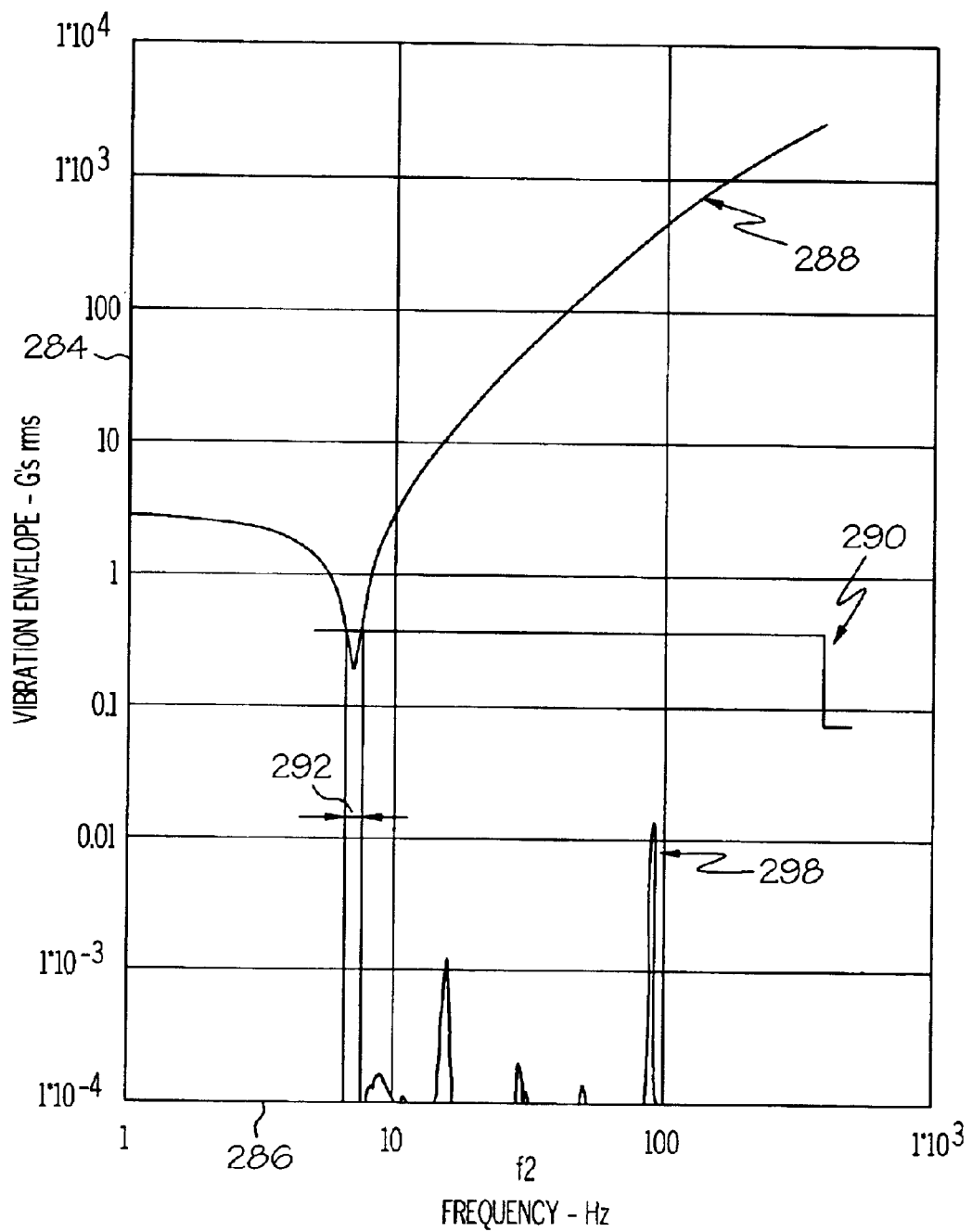
Figure 11C:
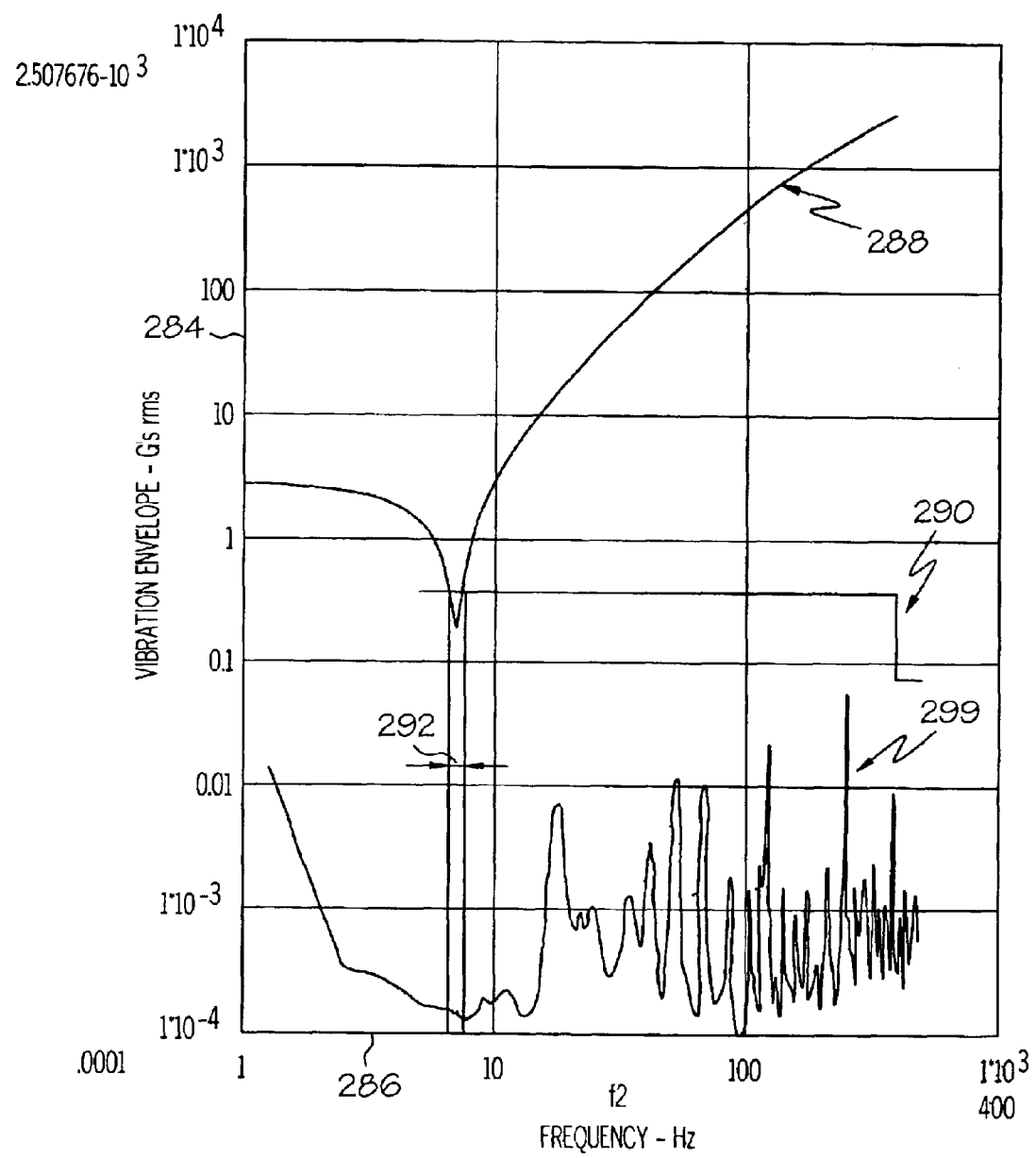

FIGS. 11a, 11b, and 11c are logarithmic graphs illustrating the increase in vibrational input which can be tolerated by using a mounting system 20 such as the one illustrated in FIG. 1. In these graphs, the Y axis 284 shows vibration in units of RMS G's (root, mean, square G force), and the X axis 286 shows frequency, in units of Hertz (Hz). The vibrational envelope 288 illustrates the amount of vibration which can be tolerated by typical mounting systems 20 across the range of frequencies shown. By comparison, the envelope 290 illustrates the vibrational tolerance of a typical disk drive assembly which is hard mounted (fastened directly to the machine, with no isolation system, such as by using screws or rivets). Accordingly, the margin of improvement which can be attained by the mounting system of FIG. 1 can be calculated by subtracting the envelope 290 from the envelope 288. As shown, this improvement, provided by utilizing the teachings of the present invention, can be quite significant.

However, in the region 292, the mounting system envelope 288 can fall below the hard-mounted disk drive assembly envelope 290. This phenomena occurs near the resonant frequency of the disk drive mounting system 20. However, as can be seen in FIGS. 11a, 11b, and 11c, the decrease in performance in this frequency region 292 is not of significance for typical machine cutting tool applications, as the resonant frequency can be designed to be substantially lower than the frequencies where vibrational force is most strong. For example, as shown in FIG. 11a, the vibration plot 294 illustrates the vibration force which can be produced by a vertical machining center. This plot illustrates the vibration created by a three-tooth cutting tool on a spindle having a speed of 1435 RPM and a feedrate of 17.2 in/min, and which is cutting at a ⅜ inch depth. It has been found that the three-tooth tool produces some of the most violent vibrations for the machine. The frequencies of interest in this example are from about 50 Hz to about 1000 Hz. As shown in the figure, in the frequency range 296, the vibration 294 of the machine exceeds the hard-mounted envelope 290, but does not exceed the spring-mounted envelope 288. Accordingly, the mounting system 20 could prevent disk drive failure or malfunctioning in this frequency region.

FIG. 11b includes a vibrational plot 298 produced by a machine tool turning center, and FIG. 11c includes a plot 299 produced by a vertical machining center. As shown in these figures, the envelope 288 provided by using teachings of the present invention tolerates much greater vibration for most frequencies, than does the envelope 290 provided by the hard-mounted device. In FIG. 11b, the frequencies where most vibration occurs is around 90 Hz, and in FIG. 11c, the frequencies of most interest fall in the range of about 20 Hz to about 600 Hz.

Figure 7:
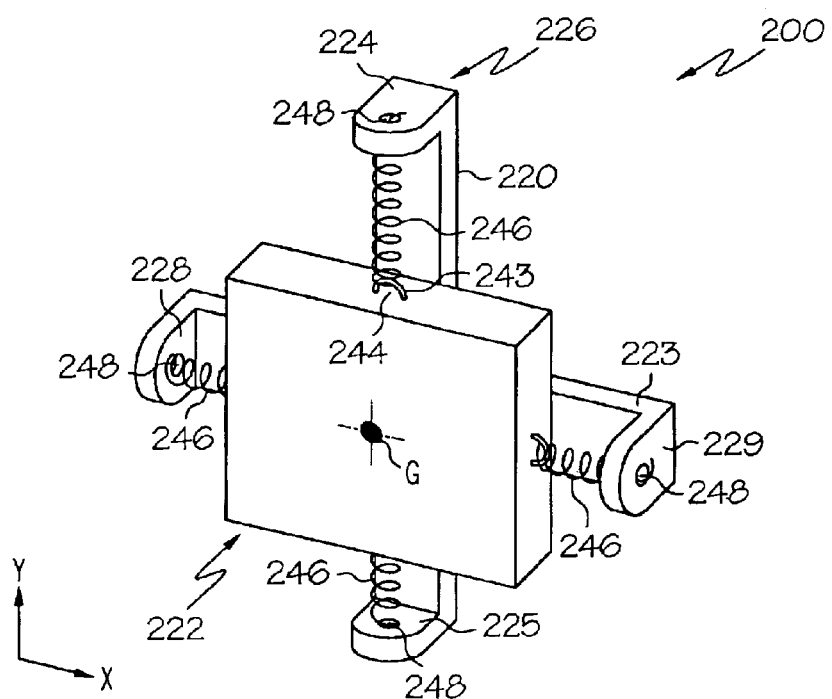
FIG. 7 is a perspective view of an alternative embodiment of a disk drive mounting assembly made according to principles of the present invention.

FIG. 7 is a perspective view of an alternative embodiment of a disk drive vibration isolation system 200, made according to principles of the present invention. The embodiment includes a suspension frame 226 which supports a disk drive 222, via springs 246. More specifically, the frame 226 includes a vertical member 220 which is connected, integrally or separately, to a horizontal member 223 preferably at a right angle. The vertical member 220 connects at an angle to an upper extension 224 which includes a receptor hole 248. Likewise the vertical member 220 connects at an angle to a lower extension 225, which also includes a receptor hole 248.

In a similar fashion, the horizontal member 222 connects at an angle to a side extension 228 on one end, and to a side extension 229 at an opposite end. The side extensions 228 and 229 also include holes 248. Thus, the side extensions 248 and 249 extend inwardly at ends of the horizontal member 223, and the extensions 224 and 225 extend inwardly at ends of the vertical member 220.

Attached to each of the receptor holes 248 of the frame 226 is a spring 246 or other suitable isolation member. Preferably, each spring 246 includes a hook or eye to assist in the attachment. However, any appropriate attachment device can be utilized to connect the springs 246 to the suspension frame 226.

The opposite ends of the springs 246 connect to the sides of a disk drive assembly 222. Again, any appropriate connector or attachment device can be utilized for this purpose. As shown in FIG. 7, a connector hook 243 can be provided on each side of the disk drive assembly 222, and the spring 246 attached through an opening 244 in the hook. As also shown in FIG. 7, it is preferred that each isolation member 246 defines a central axis, and that the central axis be substantially aligned with the center of mass G of the disk drive assembly 222. It has been found that such a configuration provides good vibration isolation, as it allows vibration forces in the X and Y axes to be transmitted through or near the center of mass G. However, it should be understood that the weight of the disk drive assembly 222 may cause the springs 246 to be misaligned from this position, without substantially affecting the vibration isolating advantages of the suspension system. As noted earlier, such misalignment may be compensated by adjusting the lengths of the springs 246, their tensions, and their placement along their respective sides of the disk drive assembly 222. By adjusting these variable parameters by design and iterative calculation, springs 246 can be selected which are very closely aligned through the center of mass G, after the load of the disk drive assembly 222 has been connected.

The foregoing descriptions of the preferred embodiments of the invention have been presented for purposes of illustration and description only. They are not intended to be exhaustive or to limit the invention to the precise forms disclosed, and modifications and variations are possible and contemplated in light of the above teachings. While a number of preferred and alternate embodiments, systems, configurations, and potential applications have been described, it should be understood that many variations and alternatives could be utilized without departing from the scope of the invention. For example, it is contemplated that springs can be used along with other devices (frictional and/or viscous) to supply a damping action. This would reduce the resonant peak at the natural frequency but would give reduced improvement above the minimum frequency of interest ($1.4*f_{natural}$).

Thus, it should be understood that the embodiments and examples have been chosen and described in order to best illustrate the principals of the invention and its practical applications to thereby enable one of ordinary skill in the art to best utilize the invention in various embodiments and with various modifications as are suited for particular uses contemplated. Accordingly, it is intended that the scope of the invention be defined by the claims appended hereto.

What is claimed is:

1. A method of isolating vibration of a disk drive, the method comprising:

suspending a disk drive assembly from a frame using a vibration isolation member, wherein rotary motion of the disk drive is substantially suppressed;

mounting the frame to a machine;

arranging a damping member on the frame such that the damping member extends through a hole on the disk drive assembly when the disk drive assembly has been suspended; and transmitting vibration forces in the machine through the center of mass of the disk drive assembly using the vibration isolation member.

2. The method of claim 1, wherein the damping member comprises a bumper attached at a right angle to the frame.

* * * * *